United States Patent
Süess et al.

(10) Patent No.: US 7,624,753 B2
(45) Date of Patent: Dec. 1, 2009

(54) CONTAINER FOR GAS STORAGE TANKS IN A VEHICLE

(75) Inventors: Uwe Süess, Wiesbaden (DE); Ludger Hilvert, Laguna Niguel, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 116 days.

(21) Appl. No.: 10/914,875

(22) Filed: Aug. 10, 2004

(65) Prior Publication Data
US 2006/0032532 A1   Feb. 16, 2006

(51) Int. Cl.
*F17D 1/00* (2006.01)
(52) U.S. Cl. ............... 137/266; 137/259; 180/69.5
(58) Field of Classification Search ............ 137/259, 137/263, 266, 376; 180/69.5
See application file for complete search history.

(56) References Cited

U.S. PATENT DOCUMENTS

| | | | | |
|---|---|---|---|---|
| 3,968,896 | A * | 7/1976 | Giacoletti et al. | 73/306 |
| 4,960,222 | A * | 10/1990 | Fields, III | 220/560.03 |
| 5,615,702 | A * | 4/1997 | Dawans et al. | 137/255 |
| 5,658,013 | A * | 8/1997 | Bees et al. | 280/831 |
| 5,676,180 | A * | 10/1997 | Teel | 141/18 |
| 5,787,920 | A * | 8/1998 | Krasnov | 137/255 |
| 5,799,685 | A * | 9/1998 | Tezuka et al. | 137/375 |
| 5,924,734 | A * | 7/1999 | Fukagawa et al. | 280/830 |
| 6,196,255 | B1 * | 3/2001 | Poillucci | 137/266 |
| 6,257,360 | B1 * | 7/2001 | Wozniak et al. | 180/69.5 |
| 6,354,321 | B1 * | 3/2002 | Horst et al. | 137/255 |
| 6,708,718 | B2 * | 3/2004 | Yamada et al. | 137/255 |
| 6,883,536 | B2 * | 4/2005 | Hervio et al. | 137/259 |

OTHER PUBLICATIONS

"Muscle Car Era Meets Future Technology in New Concept Dodge Charger R/T" [online]; [retrieved from http://www.theautochannel.com/news/press/date/19990103/press001982.html?TACH], Jan. 4, 1999.
Tiller, P.E. et al., "*Development of an Integrated Storage System for a Mid-Size Automobile*" presented on May 26-28, 1998 conference in Cologne, Germany.
"Tanks for the Long Haul"; [online]; [retrieved from http://www.car-truck.com/chryed/concept/charger3.htm]; believed to exist prior to Dec. 12, 2002.

* cited by examiner

*Primary Examiner*—Kevin L Lee
(74) *Attorney, Agent, or Firm*—Harness, Dickey & Pierce, P.L.C.

(57) ABSTRACT

A container for gas storage tanks in a vehicle is disclosed as part of a fuel storage system. The container is dimensioned to include one or more storage tanks along with a flow control device, such as a pressure regulator or automatic valve. The container does not form a fluid-tight containment around the storage tank and includes one or more ventilation openings to allow a gas within the container to be vented therefrom. There is also one or more drain openings in the container to allow liquid within the container to be drained therefrom.

27 Claims, 2 Drawing Sheets

CONTAINER FOR GAS STORAGE TANKS IN A VEHICLE

FIELD OF THE INVENTION

The present invention relates to gas storage tanks and, more specifically, to pressurized gas storage tanks in a fuel cell driven vehicle.

BACKGROUND OF THE INVENTION

With the changing emissions requirements for vehicles (e.g., automobiles, buses, trucks, etc.) alternative drives (e.g., fuel cell systems) and/or fuels (e.g., hydrogen, liquid natural gas, propane, etc.) are being implemented on the vehicles. To provide efficient storage of these alternate fuels, the fuels are stored at elevated pressures to densify the gas and provide more of the gas in a given volume of space. To facilitate the storing of these gases at higher elevated pressures, cylindrical or cylindrical-like storage tanks are typically employed.

Today's vehicles are not designed for mounting a high pressure storage tank thereon. That is, today's vehicles typically store their liquid fuel in a zero pressure or slightly pressurized storage tank that is positioned adjacent the undercarriage of the vehicle and is shaped to conform to the available space of the undercarriage. With the ability of the liquid fuel storage tanks to be shaped to conform to the configuration of the undercarriage, the undercarriages have not been designed for efficient or optimal use of high pressure cylindrical storage tanks. Additionally, the vehicles and the undercarriage are not configured to provide the high pressure storage tanks protection from the hazards of driving and in the event of a collision.

Accordingly, it is advantageous to provide a fuel storage system that can be attached to a vehicle and accommodate a high pressure storage tank. It would be advantageous if such a system were to incorporate protection for the high pressure storage tanks to protect against hazards from movement of the vehicle and/or a collision. Additionally, to facilitate the assembly of vehicles using such a fuel storage system it is advantageous to provide a fuel storage system that can be attached to the vehicle as a modular unit.

SUMMARY OF THE INVENTION

A fuel storage system according to the principles of the present invention includes a container that can be incorporated into a vehicle and installed below the undercarriage of the vehicle or in another suitable location. The container is configured to maximize the available space for storing fuel on a vehicle and includes space for a flow control device to be contained within the container. The container also incorporates ventilation and drainage openings to facilitate the removal of gas and liquids from within the container.

A fuel storage system according to the principles of the present invention includes a case having an interior. At least one pressurized storage tank is positioned in the interior of the case. There is a flow control device in the interior of the case. The flow control includes at least one of a pressure regulator attached to the at least one storage tank and operable to regulate a pressure of fuel supplied by the at least one storage tank and an automatically controlled valve operable to selectively allow a fuel flow from the at least one storage tank to an exterior of the case. There is a fuel line attached to the flow control device and operable to supply fuel from the at least one storage tank. The fuel line extends from the flow control device to an exterior of the case.

A different fuel storage system for a vehicle according to the principles of the present invention is also disclosed. This fuel storage system includes a case having an interior. There is at least one pressurized storage tank positioned in the interior of the case. There is a fuel line communicating with the storage tank and extending to an exterior of the case. There is at least one ventilation opening in the case. The opening is operable to vent a fluid from the interior of the case.

In another aspect of the present invention, an automotive vehicle is disclosed. The automotive vehicle includes a fuel cell system including a fuel cell stack operable to react a fuel and an oxidant to produce electrical power. There is a fuel storage system operable to store and supply the fuel. The fuel storage system includes at least one storage tank. There is a first support surrounding a portion of the at least one storage tank. A second support surrounds a different portion of the at least one storage tank. The first and second supports are attached together with the at least one storage tank disposed between the first and second supports. There is also at least one drain opening in one of the supports. The drain opening is operable to drain a fluid from within the supports.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiment is merely exemplary in nature and is in no way intended to limit the invention, its application, or uses.

Figure 1:
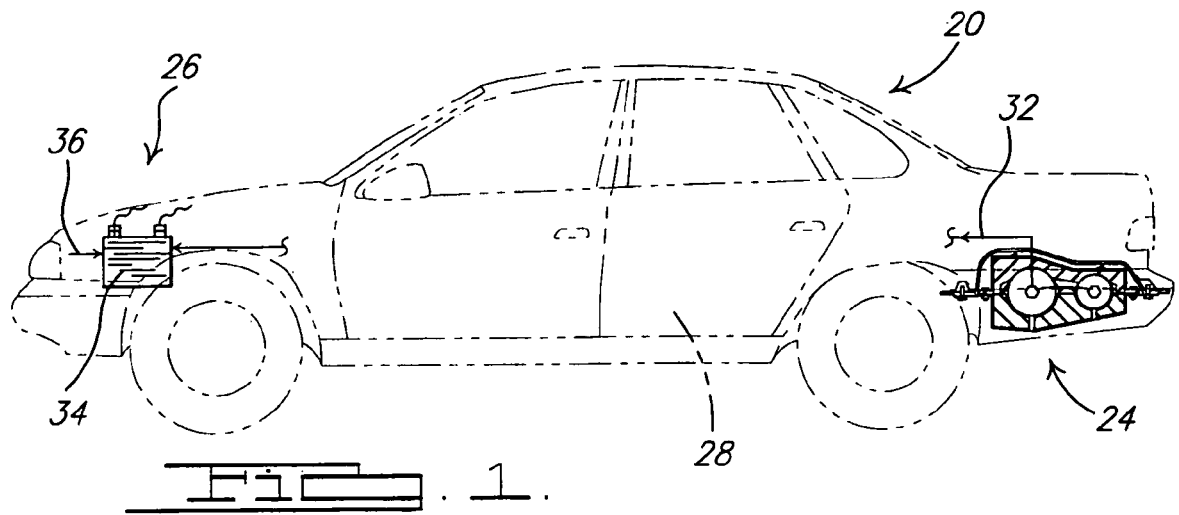
FIG. 1 is a simplified elevation view of a vehicle powered by a fuel cell system and having a fuel storage system according to the principles of the present invention.

Referring to FIG. 1, a vehicle 20, in this case a passenger vehicle, with a fuel storage system 24 according to the principles of the present invention and a fuel cell system 26 is illustrated. Vehicle 20 has a body 28 and an undercarriage 30 to which fuel storage system 24 is mounted. Fuel storage system 24 is operable to store a fuel and to supply a stored fuel to fuel cell system 26 via fuel stream 32, as described below. Alternatively, vehicle 20 can have an internal combustion engine (not shown) which receives fuel stream 32 from fuel storage system 24.

Fuel cell system 26 includes a fuel cell stack 34 that is comprised of a plurality of fuel cells and is operable to react fuel stream 32 with an oxidant stream 36 to produce electrical power, as known in the fuel cell art. In proton exchange membrane (PEM) type fuel cells, hydrogen is supplied to the anode of the fuel cell, and oxygen is supplied to the cathode. Accordingly, when fuel cell stack 34 uses PEM type fuel cells, fuel stream 32 is a hydrogen-containing stream and oxidant stream 36 is an oxygen-containing stream. PEM fuel cells include a membrane electrode assembly (MEA) comprising a thin, proton transmissive, non-electrically conductive solid polymer electrolyte membrane having the anode catalyst on one of its faces and the cathode catalyst on the opposite face. The MEA is sandwiched between a pair of electrically conductive elements which serve as current collectors for the anode and cathode, and contain appropriate channels and/or openings therein for distributing the fuel cell's gaseous reactants over the surfaces of the respective anode and cathode catalyst. A typical PEM fuel cell and its MEA are described in U.S. Pat. Nos. 5,272,017 and 5,316,871 issued respectively Dec. 21, 1993 and May 31, 1994 and assigned to General Motors Corporation, the disclosures of which are herein incorporated by reference.

The term "fuel cell" is typically used to refer to either a single cell or a plurality of cells depending on the context. A plurality of individual cells are commonly bundled together to form a fuel cell stack. Each cell within the stack comprises the MEA described earlier, and each such MEA provides its increment of voltage. Typical arrangements of multiple cells in a stack are described in U.S. Pat. No. 5,763,113 assigned to General Motors Corporation, and which is herein incorporated by reference. While fuel cell stack 34 is described as a proton exchange membrane type of fuel cell stack, it should be appreciated that other fuel cell stacks can be employed without departing from the scope of the present invention. Electrical power produced by fuel cell system 26 is used to provide electrical power to vehicle 20 which can be used to propel vehicle 20 through the use of electrical motors.

Referring now to FIG. 1, vehicle 20 is shown with the preferred embodiment of a fuel storage system 24 according to the principles of the present invention. Fuel storage system 24 utilizes a case 40 that surrounds a pair of storage tanks 42, 44. Case 40 is attached to undercarriage 30 of vehicle 20. Case 40 provides for protection of fuel storage system 24 and more particularly storage tanks 42, 44 from damage caused by debris or other foreign materials hitting fuel storage system 24 as vehicle 20 moves and/or in the event of a collision.

Figure 4:
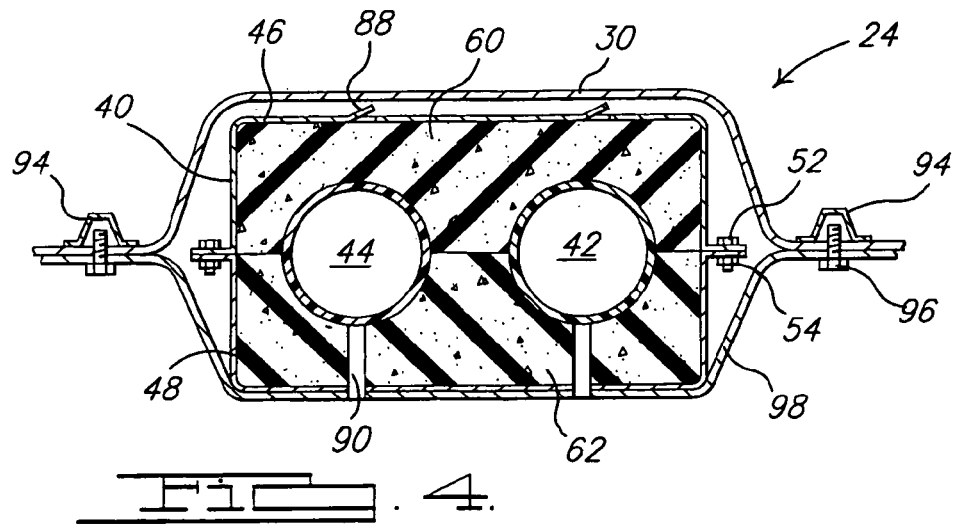
FIG. 4 is a cross-sectional view of an alternate configuration of the fuel storage system of FIG. 1

Storage tanks 42 and 44 are designed to store the fuel for vehicle 20. Storage tanks 42 and 44 are designed to store the fuel at an elevated pressure to densify the fuel and maximize the fuel storage for the available space. To provide densification of the fuel, storage tanks 42 and 44 are preferably designed to be able to accommodate a pressure of at least 70 MPa. It should be appreciated, however, that lower and higher pressures can be utilized and storage tanks 42 and 44 can be designed to accommodate the lower and higher pressures without departing from the scope of the present invention. In addition to being capable of storing the fuel at these high pressures, storage tanks 42 and 44 should also be designed to resist puncturing in the event of incidental contact with a foreign object such as in the event of a collision of vehicle 20. A variety of storage tanks can be employed that have the above-stated characteristics. For example, storage tanks 42 and 44 can be Type III storage tanks that include a metal liner or Type IV storage tanks that are made from composite materials and plastics such as high density polyethylene and carbon fiber. Type IV tanks experience growth as they are pressurized and, accordingly, when Type IV tanks are used case 40 is configured to allow for the change in dimensions of storage tanks 42 and 44 as the pressure within storage tanks 42 and 44 varies. Additionally, as shown, storage tanks 42 and 44 are of differing sizes. The differing sizes are chosen to provide efficient storage of the fuel in the space that is available. That is, the specific size of each storage tank 42 and 44 is chosen to provide for efficient storage of the fuel in the space that is available. To this end, along with adjusting the size of the storage tanks, the number of storage tanks that are employed can also vary. For example, as shown in FIG. 4, two storage tanks of the same size can be used. Additionally, three storage tanks of the same or of differing sizes can be employed if such provides for efficient storage of fuel in the space available on vehicle 20. Thus, the size of storage tanks 42 and 44 and the number of storage tanks will vary without departing from the scope of the present invention.

Figure 2:
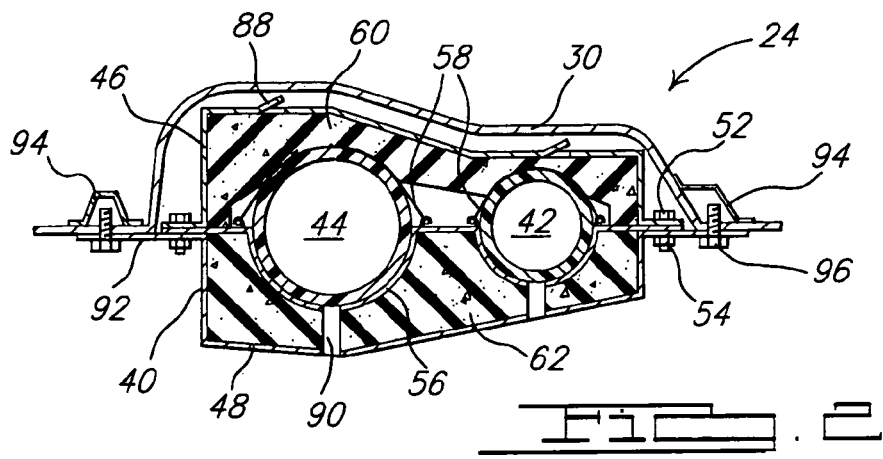
FIG. 2 is a cross-sectional view of the fuel storage system of FIG. 1.
Figure 3:
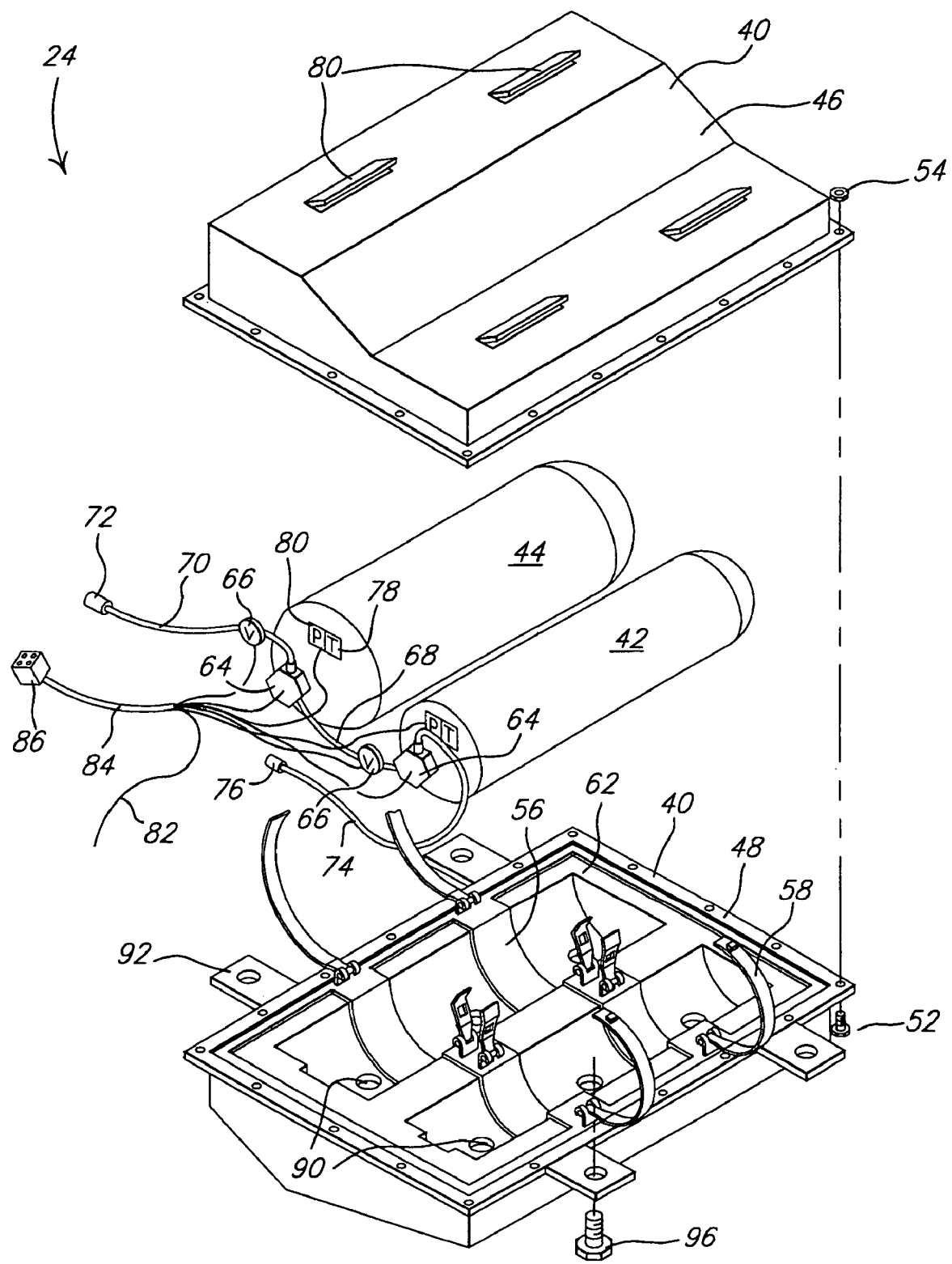
FIG. 3 is an exploded view of the fuel storage system of FIG. 1.

Case 40 is comprised of a first or upper portion 46 that is configured to surround a portion of storage tanks 42, 44 and a second or lower portion 48 that is configured to surround the remaining portion of storage tanks 42, 44. Upper and lower portions 46 and 48 are attached together to form case 40 which protect storage tanks 42, 44. Upper and lower portions 46 and 48 can be attached together in a variety of ways. For example, as shown in FIGS. 2 and 3, bolts 52 and complementary nuts 54 are used to secure upper and lower portions 46 and 48 together. Alternately, screws, clamps, hinges or other mechanical type fasteners can be used. Upper and lower portions 46 and 48 do not need to be attached together in a fluid tight manner as case 40 is not meant to act as a secondary containment for the fuel in tanks 42, 44.

The external shape of upper and lower portions 46 and 48 can vary to accommodate the location on vehicle 20 within which fuel storage system 24 is located. That is, as shown in FIG. 2, the upper and lower portions 46 and 48 have an outer surface that varies as it extends between opposite sides. This outer configuration is contoured to be complementary to a contour of undercarriage 30 of vehicle 20. In contrast, as shown in FIG. 4 (which is an alternate embodiment of fuel storage system 24), the outer configuration of upper and lower portions 46 and 48 can be generally uniform and provide for a rectangular type enclosure when the configuration of undercarriage 30 facilitates such configuration for upper and/or lower portions 46 and 48. Thus, the external configuration of case 40 can vary and can be customized to conform to the available space on vehicle 20 within which fuel storage system 24 is disposed. Preferably, the external configuration of case 40 is configured to make efficient use of the available space in vehicle 20 within which fuel storage system 24 is disposed. In addition to customizing the external configuration of case 40 to efficiently use the available space in vehicle 20, the size and number of storage tanks 42, 44 that are used is also chosen to make efficient use of the available space.

Lower portion 48 has a pair of braces 56 that extend between sides of lower portion 48 transverse to the orientation of storage tanks 42,44. Braces 56 are complementary to the exterior configuration of tanks 42,44 and form a cradle on which tanks 42, 44 reside. Braces 56 can be a plurality of braces that are spaced along the length of case 40, as shown, or can be a single brace that extends a portion or an entirety of the length of lower portion 48 of case 40. Preferably, tanks 42, 44 are strap mounted to braces 56 and lower portion 48 with straps 58. Alternatively, tanks 42, 44 can be neck mounted to lower portion 48, as is known in the art.

Both upper and lower portions 46 and 48 have respective foam members 60, 62. Foam members 60, 62 are dimensioned to be complementary to the interior of upper and lower portions 46 and 48, braces 56, straps 58 and the external shape of storage tanks 42, 44. Additionally, foam members 60, 62 are dimensioned to allow space for any plumbing hardware, electrical hardware and other components associated with storage tanks 42, 44. In an alternate embodiment, as shown in FIG. 4, tanks 42, 44 are supported by lower foam member 62 and lower portion 48 of case 40. This embodiment can be used when the weight of tanks 42, 44 is small enough such that tanks 42, 44 can be safely supported by lower foam member 62 and lower portion 48 of case 40 without the need for braces 56. In this embodiment, foam members 60, 62 are in direct contact with the interior walls of respective upper and lower portions 46 and 48 such that foam members 60, 62 do not move relative to upper and lower portions 46 and 48. Each foam member 60, 62 is contoured to be complementary to an exterior contour of storage tanks 42, 44 so that storage tanks 42, 44 are secured between foam members 60, 62 when upper and lower portions 46 and 48 are attached together. Foam members 60, 62 are configured to be in direct contact with the exterior of storage tanks 42, 44 so that tanks 42, 44 are adequately supported and little movement of tanks 42, 44 relative to case 40 is possible. Thus, storage tanks 42, 44 can be supported by braces 56 and/or foam members 60, 62.

In addition to providing support for storage tanks 42, 44, foam members 60, 62 also provide energy absorption in the event of a collision of vehicle 20 or fuel storage system 24 with a foreign object. The energy absorbing characteristics of foam members 60, 62 serve to dissipate energy transferred during a collision so that storage tanks 42, 44 and the associated components are less likely to be damaged. To provide the energy absorbing characteristics, foam members 60, 62 are preferably made of a closed cell foam, such as PU (Polyurethane), Epoxy-Foam and PMI (Polymethacrylimide). However, it should be appreciated that other types of materials, such as an open cell foam or other impact absorbing materials and structures (e.g. honeycomb structures), can be used to make foam members 60, 62 without departing from the scope of the present invention. Thus, foam members 60, 62 can provide dual functionality of supporting storage tanks 42, 44 and protecting fuel storage system 24 in the event of an accident.

As stated above, foam members 60, 62 are configured to provide space for the various components of fuel storage system 24 to fit within case 40. Specifically, fuel storage system 24 includes a flow control device, in this case in the form of a pair of pressure regulators 64 that are attached to respective storage tanks 42, 44 and automatically controlled valves or solenoids 66. Pressure regulators 64 are interconnected by a fuel line 68 and are operable to control the pressure of fuel supplied by storage tanks 42, 44. Fuel line 68 and one of valves 66 enable fuel to be routed between regulators 64 and between storage tanks 42, 44 via regulators 64. Valves 66 work with regulators 64 to control the flow of fuel between storage tanks 42, 44 and to control fuel stream 32. A fuel fill line 70 is attached to one of regulators 64 that allows storage tanks 42, 44 to be filled with fuel. Fuel fill line 70 has a fitting 72 on its end that is configured to be connected to a complementary receptacle (not shown) on vehicle 20 to allow storage tanks 42, 44 to be filled with fuel from a convenient location on vehicle 20. A fuel supply line 74 is connected to the other of regulators 64. Fuel supply line 74 is operable to supply fuel from storage tanks 42, 44 to an internal combustion engine (not shown) or fuel cell system 26 as fuel stream 32. Fuel supply line 74 has a fitting 76 that is configured to be attached to a complementary receptacle (not shown) on vehicle 20 to supply fuel to fuel cell system 26. Fuel storage system 24 also includes temperature sensors 78 that measure the fuel temperature inside tanks 42, 44 and pressure sensors 80 that measure the pressure inside tanks 42, 44 and/or fuel lines 68, 70 and 74. Fuel storage system 24 also includes a ground cable 82 that is used to ground storage tanks 42, 44 to body 28 of vehicle 20. Ground cable 82 is bundled together with the rest of the electrical leads for the various components of fuel storage system 24 and are routed out of case 40 as a bundle 84 having a fitting 86 that can be attached to a complementary fitting (not shown) on vehicle 20 to connect the electronic controls and sensors of fuel storage system 24 to the control systems onboard vehicle 20. Thus, in the preferred embodiment pressure regulators 64, valves 66 and temperature and pressure sensors 78 and 80 are contained within case 40 and foam members 60, 62 are configured to provide recesses therein to accommodate these components of fuel storage system 24.

As stated above, fuel storage system 24 is not designed to be a secondary containment for the fuel contained within storage tanks 42, 44. Rather, fuel storage system 24 is designed to allow any gas that may occur within the interior of case 40 to be removed therefrom along with any moisture or other liquids that may find their way into the interior of case 40. To accomplish this, fuel storage system 24 utilizes natural ventilation wherein there are a plurality of openings 88 located on the top surface of upper portion 46 of case 40. Openings 88 are preferably in the form of louvers, as shown, that allow for any gases accumulated or that occur within case 40 to be vented therefrom. Louvers 88 are positioned on the top of upper portion 46 because hydrogen is lighter than air and will rise to the top of the interior of case 40. Preferably, louvers 88 are configured in conjunction with the undercarriage 30 of vehicle 20 to provide a Venturi effect wherein low pressure occurs just outside of louvers 88 so that gas within case 40 will easily flow to an exterior of case 40 through louvers 88. In addition to louvers 88, case 40 also has one or more drain holes or openings 90. Drain openings 90 are located on the bottom of lower portion 48 of case 40. Drain openings 90 allow any liquid that occurs within case 40 to be drained therefrom. Preferably, drain openings 90 have a deflector or screen to inhibit and/or avoid liquids or other contaminants from splashing up or entering case 40 via drain openings 90. To accommodate ventilation openings 88 and drain openings 90 and their operation, foam members 60, 62 have complementary openings or channels therethrough to facilitate the flow of gases and liquids out of case 40 through louvers 88 and drain openings 90. Additionally, foam members 60, 62 can be provided with an optional barrier, such as a metallic foil layer, to inhibit the permeation of leaking fuel into the cells of foam members 60, 62, in the event that a leak in fuel storage system 24 occurs.

Fuel storage system 24 can be mounted to undercarriage 30 of vehicle 20 in a variety of manners. For example, as shown in FIGS. 1-3, lower portion 48 can have a plurality of flanges 92 that extend outwardly from lower portion 48. Flanges 92 are aligned with cross members 94 on undercarriage 30 of vehicle 20 and secured to cross members 94 with bolts 96 or other mechanical fasteners, such as screws, clamps or the like. Alternatively, as shown in FIG. 4, one or more straps 98 can be secured to cross members 94 with bolts 96 to suspend case 40 from undercarriage 30 of vehicle 20. Straps 98 can be preconfigured to generally correspond to the external configuration of case 40 and the location of cross members 94 or can be flexible so that straps 98 can be used with a variety of cases 40 having differing external configurations.

Fuel storage system 24 is installed in vehicle 20 as a modular unit. That is, case 40, storage tanks 42, 44, regulators 64, 66, and fuel lines 68, 70 and 74, sensors 78, 80, ground cable 82 and the associated electrical wires in bundle 84 are preassembled in a separate facility or in a static station. Then, modular fuel storage system 24 is installed on undercarriage 30 of vehicle 20 as a modular unit on the assembly line, which may be a moving one. To install modular fuel storage system 24, flanges 92 are aligned with cross members 94 and bolts 96 are then used to secure flanges 92 to cross members 94.

Alternately, modular fuel storage system 24 is positioned adjacent undercarriage 30 and one or more straps 98 are positioned below case 40 and aligned with cross members 94 so that bolts 96 can be used to install straps 98 to undercarriage 30 and thereby suspend modular fuel storage system 24 from undercarriage 30. Fittings 72, 76 on respective fuel fill and supply lines 70 and 74 and fitting 86 on bundle 84 can then be connected to complementary receptacles on vehicle 20.

It should be appreciated that while storage tanks 42, 44 are shown as being cylindrical or cylindrical in shape, other shapes, including non-cylindrical and asymmetrical shapes for storage tanks 42, 44 can be employed without departing from the scope of the present invention. Additionally, fuel storage system 24 can be mounted to vehicle 20 in locations other than adjacent undercarriage 30. For example, fuel storage system 24 can be mounted in an interior compartment of vehicle 20 that is separated from the passenger compartments, such as under a front section of vehicle 20 adjacent an internal combustion engine (not shown) or fuel cell system 26. Additionally, it should be appreciated that while fuel storage system 24 is shown as being installed on a passenger vehicle, fuel storage system 24 can be employed on other types of vehicles such as buses, trucks and the like without departing from the scope of the invention. Additionally, a fuel sensor, such as a hydrogen sensor, can be employed in fuel storage system 24 to signal an alarm in the event that a fuel leak occurs.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel storage system for a vehicle, the fuel storage system comprising:
   a case formed by at least two components, said components defining an interior of said case, said interior including at least one cavity;
   at least one pressurized storage tank positioned in a major cavity of said interior of said case;
   a flow control device in said major cavity of said interior of said case along with said at least one storage tank with said flow control device adjacent said at least one storage tank without an intervening wall or structural member therebetween, said flow control device including at least one of a pressure regulator attached to said at least one storage tank and operable to regulate a pressure of fuel supplied by said at least one storage tank and an automatically controlled valve operable to selectively allow a fuel flow from said at least one storage tank to an exterior of said case; and
   a fuel line attached to said flow control device and operable to supply fuel from said at least one storage tank, said fuel line extending from said flow control device to an exterior of said case.

2. The fuel storage system of claim 1, wherein a portion of said interior of said case is filled with a foam material.

3. The fuel storage system of claim 2, wherein said foam material is configured to be complementary to an exterior of said at least one storage tank and said at least one storage tank is at least partially supported in said case by said foam material.

4. The fuel storage system of claim 2, wherein said foam material is a closed cell foam.

5. The fuel storage system of claim 1, wherein said case is adapted to be attached to an undercarriage of a vehicle.

6. The fuel storage system of claim 1, wherein said at least one storage tank comprises at least two storage tanks.

7. The fuel storage system of claim 1, wherein said at least one storage tank is cylindrical in shape.

8. The fuel storage system of claim 1, wherein said case has at least one ventilation opening.

9. The fuel storage system of claim 1, wherein said case has at least one drain opening that communicates with said interior and with an exterior of said case to allow fluid in said interior to drain from said case.

10. The fuel storage system of claim 8, wherein said at least one ventilation opening is located on a top portion of said case directly above said at least one storage tank.

11. The fuel storage system of claim 8, wherein said at least one ventilation opening comprises a plurality of ventilation openings in said case.

12. The fuel storage system of claim 8, wherein said at least one ventilation opening is always open.

13. The fuel storage system of claim 9, wherein a drain opening is disposed beneath each storage tank in said case.

14. The fuel storage system of claim 2, wherein said foam material surrounds a majority portion of said at least one tank.

15. The fuel storage system of claim 1, wherein an exterior of said case is formed entirely by two components releasably attached together.

16. A vehicle including the fuel storage system according to claim 1.

17. The vehicle of claim 16, further comprising a fuel storage system operable to store and supply said fuel from said fuel storage system according to claim 1.

18. A fuel storage system for a vehicle, the fuel storage system comprising:
    a case having an exterior entirely formed by two components releasably attached together and defining an interior;
    at least one pressurized storage tank positioned in said interior of said case;
    a fuel line communicating with said storage tank and extending to an exterior of said case;
    at least one ventilation opening in a top of said case directly above said at least one storage tank, said opening operable to vent a fluid from said interior of said case; and
    a flow control device in said interior attached to said at least one storage tank, said flow control device adjacent said at least one storage tank without an intervening wall or structural member therebetween, said flow control device including at least one of a pressure regulator attached to said at least one storage tank and operable to regulate a pressure of fuel supplied by said at least one storage tank and an automatically controlled valve operable to selectively allow a fuel flow from said at least one storage tank to an exterior of case.

19. The fuel storage system of claim 18, wherein said at least one ventilation opening comprises a plurality of ventilation openings in said case.

20. The fuel storage system of claim 18, wherein said ventilation opening is always open.

21. The fuel storage system of claim 18, further comprising at least one drain opening in said case communicating with said interior and with an exterior of said case, said at least one drain opening operable to allow a fluid to drain from said interior of said case.

22. The fuel storage system of claim 21, wherein said drain opening is always open.

23. The fuel storage system of claim 21, wherein a drain opening is disposed beneath each storage tank in said case.

24. The fuel storage system of claim 18, wherein said interior is a single cavity within which said at least storage tank and said flow control device are located.

25. The fuel storage system of claim 24, wherein said flow control device is adjacent said at least one storage tank in said cavity without a wall or other intervening partition therebetween.

26. A fuel storage system for a vehicle, the fuel storage system comprising:
   a case having a single interior cavity formed entirely by two components releasably attached together, said two components substantially defining an entire exterior of said case;
   at least one pressurized storage tank positioned in said interior cavity;
   a flow control device in said interior cavity and attached to said at least one storage tank, said flow control device including at least one of a pressure regulator attached to said at least one storage tank and operable to regulate a pressure of fuel supplied by said at least one storage tank and an automatically controlled valve operable to selectively allow a fuel flow from said at least one storage tank to an exterior of said case; and
   a fuel line attached to said flow control device and operable to supply fuel from said at least one storage tank, said fuel line extending from said flow control device to an exterior of said case.

27. The fuel storage system of claim 26, wherein said flow control device is adjacent said at least one storage tank in said interior cavity without any structural member therebetween.

* * * * *